(12) United States Patent
Min et al.

(10) Patent No.: US 7,957,452 B2
(45) Date of Patent: Jun. 7, 2011

(54) DIRECT SEQUENCE SPREAD SPECTRUM TRANSCEIVER

(75) Inventors: Sang Hyun Min, Gyunggi-do (KR); Koon Shik Cho, Gyunggi-do (KR); Jae Hyung Lee, Gyunggi-do (KR); Kwang Mook Lee, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 713 days.

(21) Appl. No.: 12/098,396

(22) Filed: Apr. 4, 2008

(65) Prior Publication Data

US 2009/0074034 A1    Mar. 19, 2009

(30) Foreign Application Priority Data

Sep. 13, 2007 (KR) ........................ 10-2007-0093022

(51) Int. Cl.
*H04B 1/707* (2006.01)
(52) U.S. Cl. .......................................... 375/140; 341/50
(58) Field of Classification Search .................. 375/140, 375/130, 295, 316; 382/248, 281; 341/173, 341/50
See application file for complete search history.

(56) References Cited

U.S. PATENT DOCUMENTS

| 5,870,414 | A | * | 2/1999 | Chaib et al. | ................... 714/792 |
| 2003/0235240 | A1 | * | 12/2003 | Kawamoto et al. | ........... 375/148 |
| 2004/0071357 | A1 | * | 4/2004 | Cook | ............................ 382/248 |

FOREIGN PATENT DOCUMENTS

EP    1 134 928 A1    9/2001
* cited by examiner

*Primary Examiner* — Chieh M Fan
*Assistant Examiner* — Aristocratis Fotakis
(74) *Attorney, Agent, or Firm* — Lowe, Hauptman, Ham & Berner, LLP (57) ABSTRACT

A direct sequence spread spectrum (DSSS) transceiver including a DSSS transmitter and a DSSS receiver, wherein the DSSS transmitter includes: an integral code mapping unit mapping source bit data in one of $2^N$ (N is a natural number) of predetermined symbols by N bits and mapping the symbol in one of integral code words that are obtained by previously integrating each of $2^N$ of bi-orthogonal code words; and a radio frequency (RF) transmitting unit transmitting the integral code words mapped by the integral code mapping unit over an RF carrier wave, and the DSSS receiver includes: an RF receiving unit removing an RF carrier wave from an RF signal from the RF transmitting unit and converting an analog signal obtained by removing the RF carrier wave from the RF signal into a digital signal; a differential circuit unit differentiating and converting the digital signal from the RF receiving unit into bi-orthogonal code words; and a symbol detection unit detecting a symbol corresponding to a maximum value of correlation values between bi-orthogonal code word from the differential circuit unit and a plurality of predetermined reference code words.

6 Claims, 8 Drawing Sheets

PRIOR ART

| SOURCE BIT DATA | | | | SYMBOL | INTEGRAL CODE WORD | | | | | | | | DIFFERENTIATED CODE WORD | | | | | | | | BI-ORTHOGONAL CODE WORD | | | | | | | |
|---|---|---|---|---|---|---|---|---|---|---|---|---|---|---|---|---|---|---|---|---|---|---|---|---|---|---|---|
| | | | | | I | Q | I | Q | I | Q | I | Q | | | | | | | | | | | | | | | |
| 0 | 0 | 0 | 0 | 0 | 0 | 1 | 0 | 1 | 0 | 1 | 0 | 1 | 0 | 0 | 0 | 0 | 0 | 0 | 0 | 0 | 0 | 1 | 1 | 0 | 1 | 1 | 0 |
| 0 | 0 | 0 | 1 | 1 | 1 | 1 | 0 | 0 | 1 | 1 | 0 | 0 | 1 | 0 | 1 | 0 | 1 | 0 | 1 | 0 | 0 | 0 | 1 | 1 | 1 | 1 | 0 |
| 0 | 0 | 1 | 0 | 2 | 0 | 0 | 1 | 1 | 0 | 0 | 1 | 1 | 0 | 1 | 1 | 0 | 0 | 1 | 1 | 0 | 0 | 0 | 0 | 1 | 0 | 0 | 1 |
| 0 | 0 | 1 | 1 | 3 | 1 | 0 | 1 | 0 | 1 | 0 | 1 | 0 | 1 | 1 | 1 | 1 | 1 | 1 | 1 | 1 | 0 | 0 | 1 | 0 | 0 | 1 | 1 |
| 0 | 1 | 0 | 0 | 4 | 0 | 1 | 1 | 0 | 0 | 1 | 1 | 0 | 0 | 0 | 1 | 1 | 0 | 0 | 1 | 1 | 0 | 1 | 1 | 0 | 0 | 1 | 0 |
| 0 | 1 | 0 | 1 | 5 | 1 | 1 | 1 | 1 | 1 | 1 | 1 | 1 | 1 | 0 | 1 | 0 | 1 | 0 | 1 | 0 | 0 | 1 | 0 | 0 | 1 | 0 | 1 |
| 0 | 1 | 1 | 0 | 6 | 0 | 0 | 0 | 0 | 0 | 0 | 0 | 0 | 0 | 1 | 0 | 0 | 0 | 1 | 0 | 0 | 0 | 1 | 1 | 1 | 0 | 1 | 1 |
| 0 | 1 | 1 | 1 | 7 | 1 | 0 | 0 | 1 | 1 | 0 | 0 | 1 | 1 | 1 | 0 | 1 | 1 | 1 | 0 | 1 | 0 | 1 | 0 | 1 | 0 | 0 | 0 |
| 1 | 0 | 0 | 0 | 8 | 0 | 1 | 0 | 1 | 1 | 0 | 1 | 0 | 0 | 0 | 1 | 1 | 1 | 1 | 0 | 0 | 1 | 0 | 0 | 1 | 0 | 0 | 1 |
| 1 | 0 | 0 | 1 | 9 | 1 | 1 | 0 | 0 | 0 | 0 | 1 | 1 | 1 | 0 | 1 | 0 | 0 | 1 | 1 | 0 | 1 | 0 | 1 | 0 | 0 | 1 | 1 |
| 1 | 0 | 1 | 0 | 10 | 0 | 0 | 1 | 1 | 1 | 1 | 0 | 0 | 0 | 1 | 1 | 0 | 1 | 0 | 0 | 1 | 1 | 1 | 1 | 0 | 1 | 0 | 0 |
| 1 | 0 | 1 | 1 | 11 | 1 | 0 | 1 | 0 | 0 | 1 | 0 | 1 | 0 | 1 | 1 | 1 | 0 | 0 | 1 | 0 | 1 | 1 | 0 | 1 | 1 | 0 | 0 |
| 1 | 1 | 0 | 0 | 12 | 0 | 1 | 1 | 0 | 1 | 0 | 0 | 1 | 1 | 0 | 0 | 1 | 1 | 1 | 0 | 0 | 1 | 0 | 0 | 1 | 1 | 0 | 1 |
| 1 | 1 | 0 | 1 | 13 | 1 | 1 | 1 | 1 | 0 | 0 | 0 | 0 | 1 | 0 | 0 | 0 | 1 | 1 | 0 | 0 | 1 | 0 | 1 | 0 | 1 | 1 | 0 |
| 1 | 1 | 1 | 0 | 14 | 0 | 0 | 0 | 0 | 1 | 1 | 1 | 1 | 0 | 1 | 1 | 1 | 0 | 0 | 0 | 1 | 1 | 1 | 1 | 1 | 1 | 0 | 1 |
| 1 | 1 | 1 | 1 | 15 | 1 | 0 | 0 | 1 | 0 | 1 | 1 | 0 | 0 | 1 | 0 | 1 | 0 | 0 | 1 | 1 | 1 | 1 | 0 | 0 | 0 | 0 | 1 |

DIRECT SEQUENCE SPREAD SPECTRUM TRANSCEIVER

CROSS-REFERENCE TO RELATED APPLICATIONS

This application claims the priority of Korean Patent Application No. 2007-0093022 filed on Sep. 13, 2007, in the Korean Intellectual Property Office, the disclosure of which is incorporated herein by reference.

BACKGROUND OF THE INVENTION

1. Field of the Invention

The present invention relates to a direct sequence spread spectrum (DSSS) transceiver employed in a wireless personal area network (WPAN) communication system, and more particularly, to a DSSS transceiver capable of easily reducing an influence of a frequency error by using a short code word in an integral form in a transmitter and employing a differential detection method in a receiver.

2. Description of the Related Art

In general, IEEE 802.15.4, which is physical layer standards of a wireless personal area network (WPAN) known as Zigbee, is a standard for a wireless local communication having merits such as low speed communication, low power consumption, and low price. As application fields, there are network and control fields such as building control, home network including various home appliances and lighting fixtures, etc, cooling and heating control, mutual-assistance control, and sensor networks.

A direct sequence spread spectrum (DSSS) communication method applied to WPAN communication systems communicates by spreading one signal symbol as a certain sequence.

In this case, in the DSSS communication method, when an original signal is inputted to a pseudo-random noise sequence, it is possible to obtain a spread band spectrum signal with decreased power density per frequency.

On the other hand, when a receiving side uses the same pseudo-random noise sequence, the original signal may be restored.

Such communication method has advantages such as excellent modulation efficiency, quick synchronization of signal, and a small number of interferences in band due to lower power density and is used in code division multiple access (CDMA). Also, in Zigbee communication according to IEEE 802.15.4 standards, such DSSS communication method is used.

Figure 1:
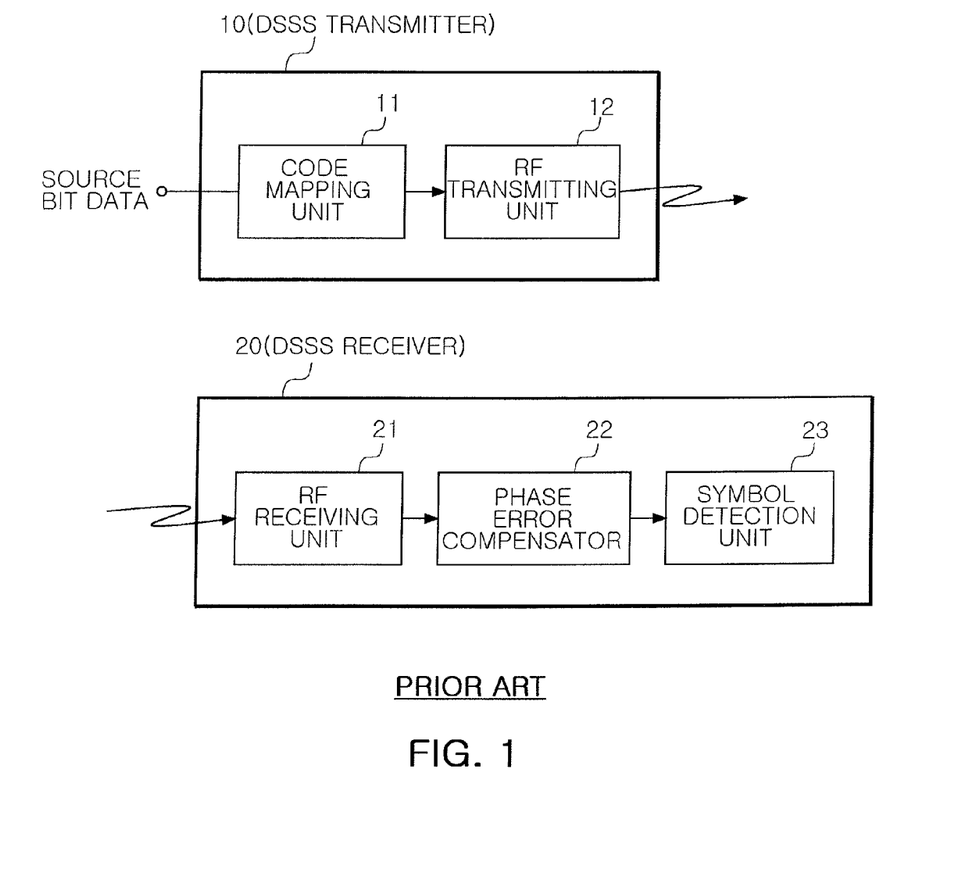
FIG. 1 is a configuration diagram illustrating a conventional direct sequence spread spectrum (DSSS) transceiver.

FIG. 1 is a configuration diagram illustrating a conventional DSSS transceiver.

The DSSS transceiver of FIG. 1 includes a DSSS transmitter 10 spreading and transmitting data according to the DSSS method and a DSSS receiver 20 restoring the data from a signal from the DSSS transmitter 10.

The DSSS transmitter 10 includes a code mapping unit 11 mapping data in a corresponding symbol by 4 bits and converts the symbol into a corresponding code and a radio frequency (RF) transmitting unit 12 transmitting the code from the code mapping unit 11 over an RF carrier wave.

The DSSS receiver 20 includes an RF receiving unit 21 converting an RF signal from the RF transmitting unit 12 into a base band signal and converting the base band signal into a digital signal, a phase error compensator 22 detecting and compensating a phase error of the base band signal from the RF receiving unit 21, and a symbol detection unit 23 detecting the symbol from the base band signal from the phase error compensator 22.

Operations of the conventional DSSS transceiver are as follows.

The DSSS transmitter 10 puts N number of bit data into one group and converts the group into one of $2^N$ of symbols having a code word length of $2^{(N-1)}$.

For example, source bit data is bound up into a group by 4 bits, the group is converted into one of 16 symbols, and the symbol is converted into one of 16 bi-orthogonal code words having 8 codes.

In following Table 1, there is shown conversion relationship between bit data and a bi-orthogonal code word.

TABLE 1

| Source bit data | | | | Symbol | Bi-orthogonal code word | | | | | | | |
|---|---|---|---|---|---|---|---|---|---|---|---|---|
| 0 | 0 | 0 | 0 | 0 | 0 | 0 | 0 | 0 | 0 | 0 | 0 | 0 |
| 0 | 0 | 0 | 1 | 1 | 0 | 1 | 0 | 1 | 0 | 1 | 0 | 1 |
| 0 | 0 | 1 | 0 | 2 | 0 | 0 | 1 | 1 | 0 | 0 | 1 | 1 |
| 0 | 0 | 1 | 1 | 3 | 0 | 1 | 1 | 0 | 0 | 1 | 1 | 0 |
| 0 | 1 | 0 | 0 | 4 | 0 | 0 | 0 | 0 | 1 | 1 | 1 | 1 |
| 0 | 1 | 0 | 1 | 5 | 0 | 1 | 0 | 1 | 1 | 0 | 1 | 0 |
| 0 | 1 | 1 | 0 | 6 | 0 | 0 | 1 | 1 | 1 | 1 | 0 | 0 |
| 0 | 1 | 1 | 1 | 7 | 0 | 1 | 1 | 0 | 1 | 0 | 0 | 1 |
| 1 | 0 | 0 | 0 | 8 | 1 | 1 | 1 | 1 | 1 | 1 | 1 | 1 |
| 1 | 0 | 0 | 1 | 9 | 1 | 0 | 1 | 1 | 1 | 0 | 1 | 0 |
| 1 | 0 | 1 | 0 | 10 | 1 | 1 | 0 | 0 | 1 | 1 | 0 | 0 |
| 1 | 0 | 1 | 1 | 11 | 1 | 0 | 0 | 0 | 1 | 0 | 0 | 1 |
| 1 | 1 | 0 | 0 | 12 | 1 | 1 | 1 | 1 | 0 | 0 | 0 | 0 |
| 1 | 1 | 0 | 1 | 13 | 1 | 0 | 1 | 0 | 0 | 1 | 0 | 1 |
| 1 | 1 | 1 | 0 | 14 | 1 | 1 | 0 | 0 | 0 | 0 | 1 | 1 |
| 1 | 1 | 1 | 1 | 15 | 1 | 0 | 0 | 1 | 0 | 1 | 1 | 0 |

The DSSS transmitter serial-to-parallel converts the bi-orthogonal code word into a code word whose order is an odd number and a code word whose order is an even number to form a bipolar signal. The bipolar signal is appropriately pulse shaping filtered and multiplied by cos wot and sin wot that are carrier high frequency element, respectively, in the RF transmitting unit 11 to modulate and transmit the same.

After that, on the other hand, the DSSS receiver 20 multiplies a received signal by cos wot by sin wot and converts the received signal into a base band signal. In this case, since carrier frequencies of the DSSS transmitter 10 and the receiver 20 are not precisely identical to each other, there occurs a frequency error distorting the base band signal. In the conventional method, a complicated frequency error compensator is used to compensate the frequency error.

Also, a leftover phase error is compensated by a phase error compensator. In the beginning of packet data, preamble data for symbol synchronization and certain data SFD notifying the beginning of payload data, which are used by a synchronizer to acquire the symbol synchronization and frame synchronization.

After acquiring the symbol synchronization, correlation operation on an input signal and $2^N$ of symbols that are reference code words is performed by a correlation unit and a symbol corresponding to a maximum correlation value is determined to be a received symbol and converted into bit data.

Generally, in communication systems supporting mobility at high speed, since a frequency error and a phase error are changed while receiving data, a complicated frequency error compensator and phase error compensator are used to compensate the frequency error and phase error in real time.

However, in the case of WPAN communication system requiring a low price, microminiaturization, and lower power consumption, a frequency error does not occur in real time while receiving packet data since mobility is very low. Accordingly, it is inappropriate to use the complicated frequency error compensator.

However, in the conventional method, when the frequency error compensator and phase error compensator are not used, there is present performance deterioration due to the frequency error and phase error.

SUMMARY OF THE INVENTION

An aspect of the present invention provides a direct sequence spread spectrum (DSSS) transceiver capable of easily reducing an influence of a frequency error by using a short code word in an integrated form in a transmitter and employing a differential detection method in a receiver in a wireless personal area network (WPAN) communication system.

According to an aspect of the present invention, there is provided a DSSS transceiver including a DSSS transmitter and a DSSS receiver, wherein the DSSS transmitter includes: an integral code mapping unit mapping source bit data in one of $2^N$ (N is a natural number) of predetermined symbols by N bits and mapping the symbol in one of integral code words that are obtained by previously integrating each of $2^N$ of bi-orthogonal code words; and a radio frequency (RF) transmitting unit transmitting the integral code words mapped by the integral code mapping unit over an RF carrier wave, and the DSSS receiver includes: an RF receiving unit removing an RF carrier wave from an RF signal from the RF transmitting unit and converting an analog signal obtained by removing the RF carrier wave from the RF signal into a digital signal; a differential circuit unit differentiating and converting the digital signal from the RF receiving unit into bi-orthogonal code words; and a symbol detection unit detecting a symbol corresponding to a maximum value of correlation values between bi-orthogonal code word from the differential circuit unit and a plurality of predetermined reference code words.

In the integral code mapping unit, each of the integral code words may be formed of $2^{(N-1)}-1$, of codes and the symbol may be mapped in one of the integral code words.

The RF transmitting unit may include: a serial-to-parallel converter dividing the integral code word into a bit row whose order is an odd number and a bit row whose order is an even number; a first pulse shaping filter converting an I digital signal including the bit row whose order is an odd number from the serial-to-parallel converter into an analog pulse signal; a second pulse shaping filter converting a Q digital signal including the bit row whose order is an even number from the serial-to-parallel converter into an analog pulse signal; a first digital-to-analog converter (DAC) converting the analog pulse signal from the first pulse shaping filter into an I analog signal; a second DAC converting the analog pulse signal from the second pulse shaping filter into a Q analog signal; and a transmitting unit transmitting the I analog signal from the first DAC and the Q analog signal from the second DAC over a predetermined RF carrier wave.

The RF receiving unit may include: a receiving unit converting an RF signal from the RF transmitting unit into an analog signal by removing an RF carrier wave from the RF signal; and an analog-to-digital converter converting the analog signal from the receiving unit into a digital signal.

The differential circuit unit may include: a delay part delaying a digital signal from the RF receiving unit by a preset amount of time; a conjugate complex number part deriving a conjugate complex number from a signal from the delay part; and a multiplier multiplying the digital signal from the RF receiving unit by a signal from the conjugate complex number part.

In the symbol detection unit, each of the plurality of reference code words may include $2^{(N-1)}$ of codes corresponding to the integral code words obtained by integrating the bi-orthogonal code words.

As described above, according to the present invention, there is an effect of easily reducing an influence of a frequency error by using a short code word in an integrated form in a transmitter and employing a differential detection method in a receiver in a WPAN communication system.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

The present invention will not be limited to the described embodiments. The embodiments are just for understanding the technical features of the present invention. The same reference numerals are used throughout to designate the same or similar components.

Figure 2:
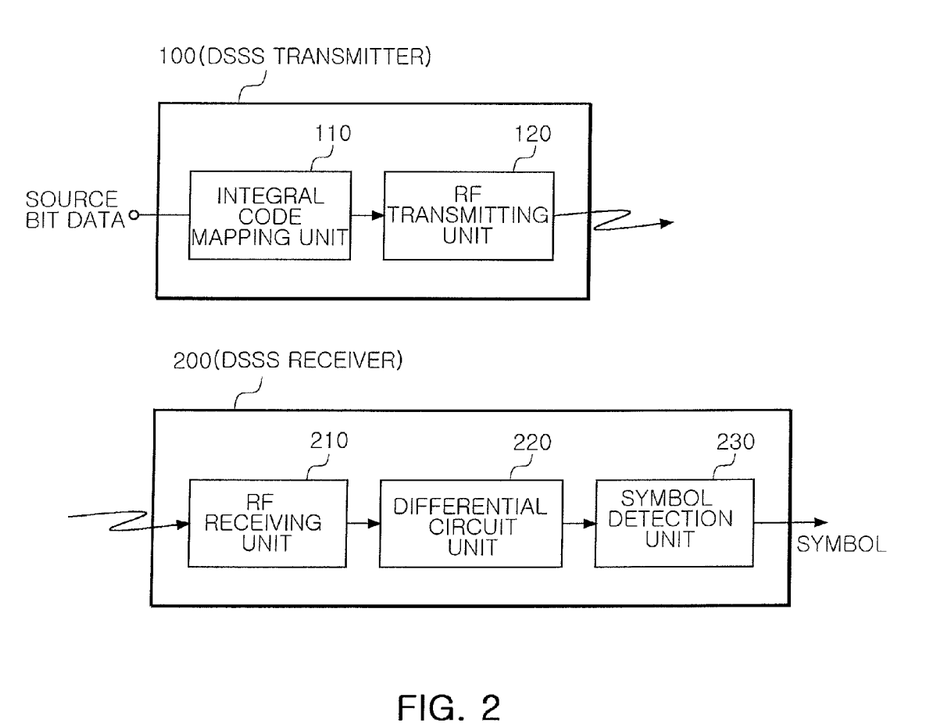
FIG. 2 is a configuration diagram illustrating a DSSS transceiver according to an exemplary embodiment of the present invention.

FIG. 2 is a configuration diagram illustrating a direct sequence spread spectrum (DSSS) transceiver according to an exemplary embodiment of the present invention.

Referring to FIG. 2, the DSSS transceiver includes a DSSS transmitter 100 and a DSSS receiver 200.

The DSSS transmitter 100 includes an integral code mapping unit 110 mapping source bit data in one of $2^N$ (N is a natural number) of predetermined symbols by N bits and mapping the symbol in one of integral code words that are obtained by previously integrating each of $2^N$ of bi-orthogonal code words and a radio frequency (RF) transmitting unit 120 transmitting the integral code words mapped by the integral code mapping unit 110 over an RF carrier wave.

In the integral code mapping unit 110, each of the integral code words may be formed of $2^{(N-1)}-1$ of codes and the symbol may be mapped in one of the integral code words.

For example, the integral code mapping unit 110 maps the source bit data in one of $2^4$ (16) of preset symbols 0 and 1 to 15 by 4 bits and maps the symbol in one of integral code words in a form obtained by previously integrating each of $2^4$ (16) of bi-orthogonal code words. In this case, each of the integral code words may be formed of $2^{(4-1)}-1$ (7) of codes.

The DSSS receiver 200 includes an RF receiving unit 210 removing an RF carrier wave from an RF signal from the RF transmitting unit 120 and converting an analog signal obtained by removing the RF carrier wave from the RF signal into a digital signal; a differential circuit unit 220 differentiating and converting the digital signal from the RF receiving unit 210 into bi-orthogonal code words; and a symbol detection unit 230 detecting a symbol corresponding to a maximum value of correlation values between bi-orthogonal code word from the differential circuit unit 220 and a plurality of predetermined reference code words.

Figure 3:
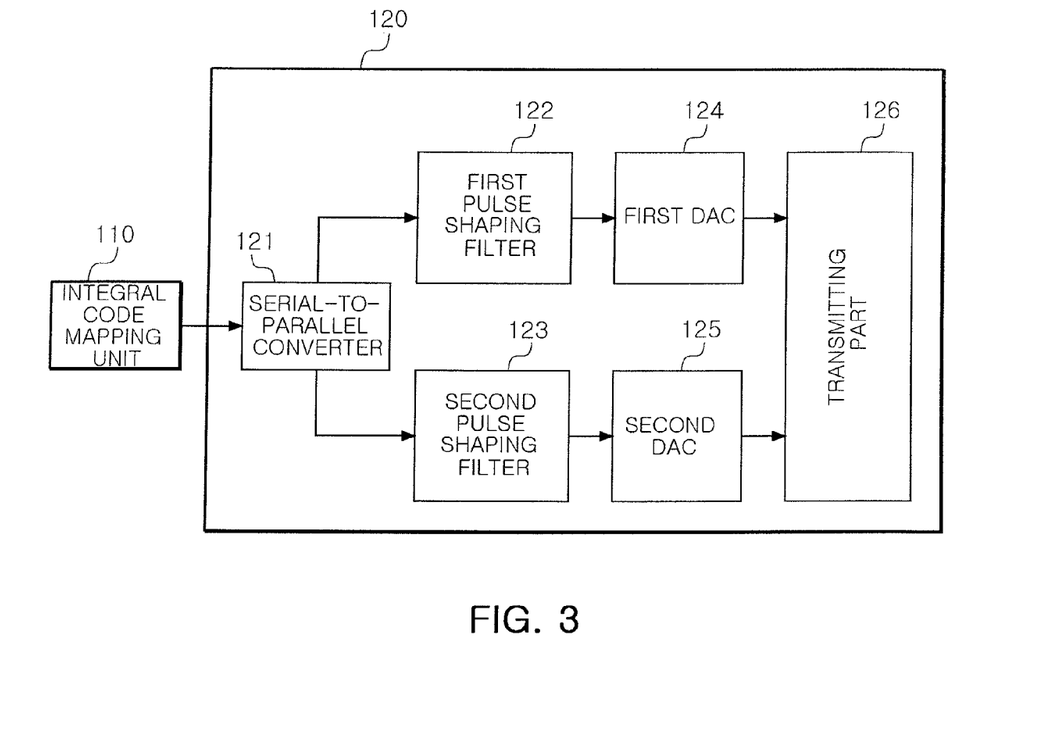
FIG. 3 is a configuration diagram illustrating a radio frequency (RF) transmitting unit of FIG. 2.

FIG. 3 is a configuration diagram illustrating the RF transmitting unit 120.

Referring to FIG. 3, the RF transmitting unit 120 includes a serial-to-parallel converter 121 dividing the integral code word into a bit row whose order is an odd number and a bit row whose order is an even number; a first pulse shaping filter 122 converting an I digital signal including the bit row whose order is an odd number from the serial-to-parallel converter 121 into an analog pulse signal; a second pulse shaping filter 123 converting a Q digital signal including the bit row whose order is an even number from the serial-to-parallel converter 121 into an analog pulse signal; a first digital-to-analog converter (DAC) 124 converting the analog pulse signal from the first pulse shaping filter 122 into an I analog signal; a second DAC 125 converting the analog pulse signal from the second pulse shaping filter 123 into a Q analog signal; and a transmitting part 126 transmitting the I analog signal from the first DAC 124 and the Q analog signal from the second DAC 125 over a predetermined RF carrier wave.

Figure 4:
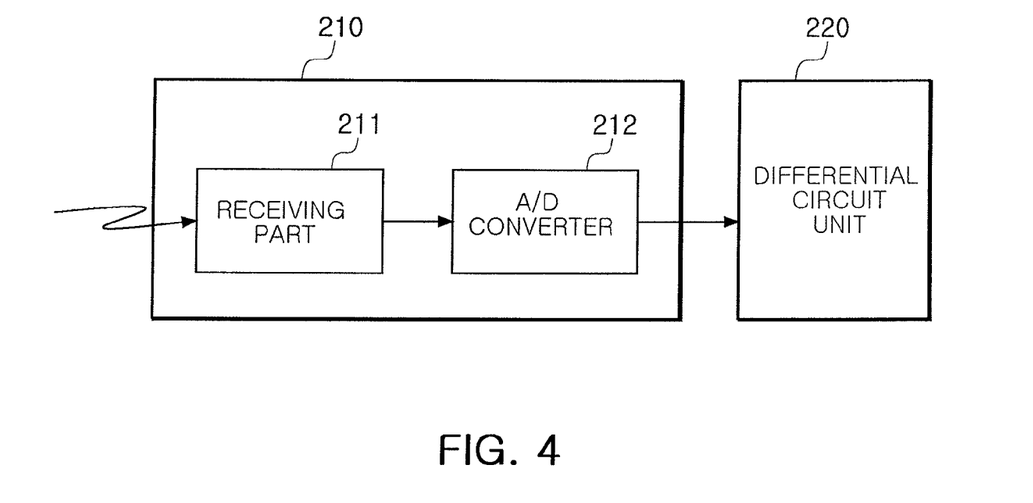
FIG. 4 is a configuration diagram illustrating a configuration diagram illustrating an RF receiving unit of FIG. 2.

FIG. 4 is a configuration diagram illustrating the RF receiving unit 210.

Referring to FIG. 4, the RF receiving unit 210 includes a receiving part 211 converting an RF signal from the RF transmitting unit 120 into an analog signal by removing an RF carrier wave from the RF signal; and an analog-to-digital (A/D) converter 212 converting the analog signal from the receiving part 211 into a digital signal.

Figure 5:
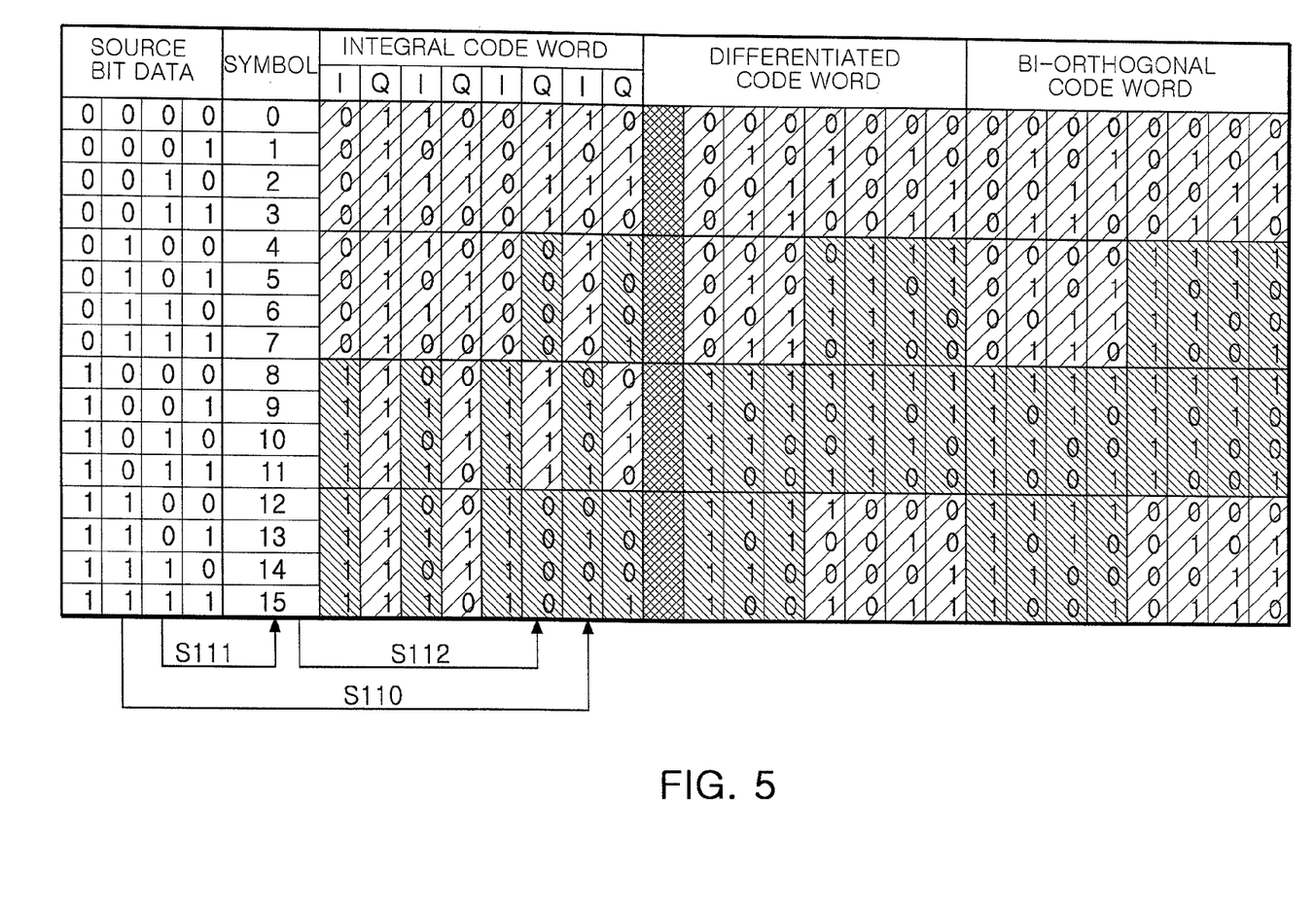
FIG. 5 is a diagram illustrating signal processing in a DSSS transmitter according to an exemplary embodiment of the present invention.

FIG. 5 is a diagram illustrating signal processing in the DSSS transmitter 100.

Referring to FIG. 5, S110 indicates a signal processing process in which S111 indicates a process of converting source bit data into a symbol and S112 indicates a process of converting the symbol into an integral code word.

Figure 6:
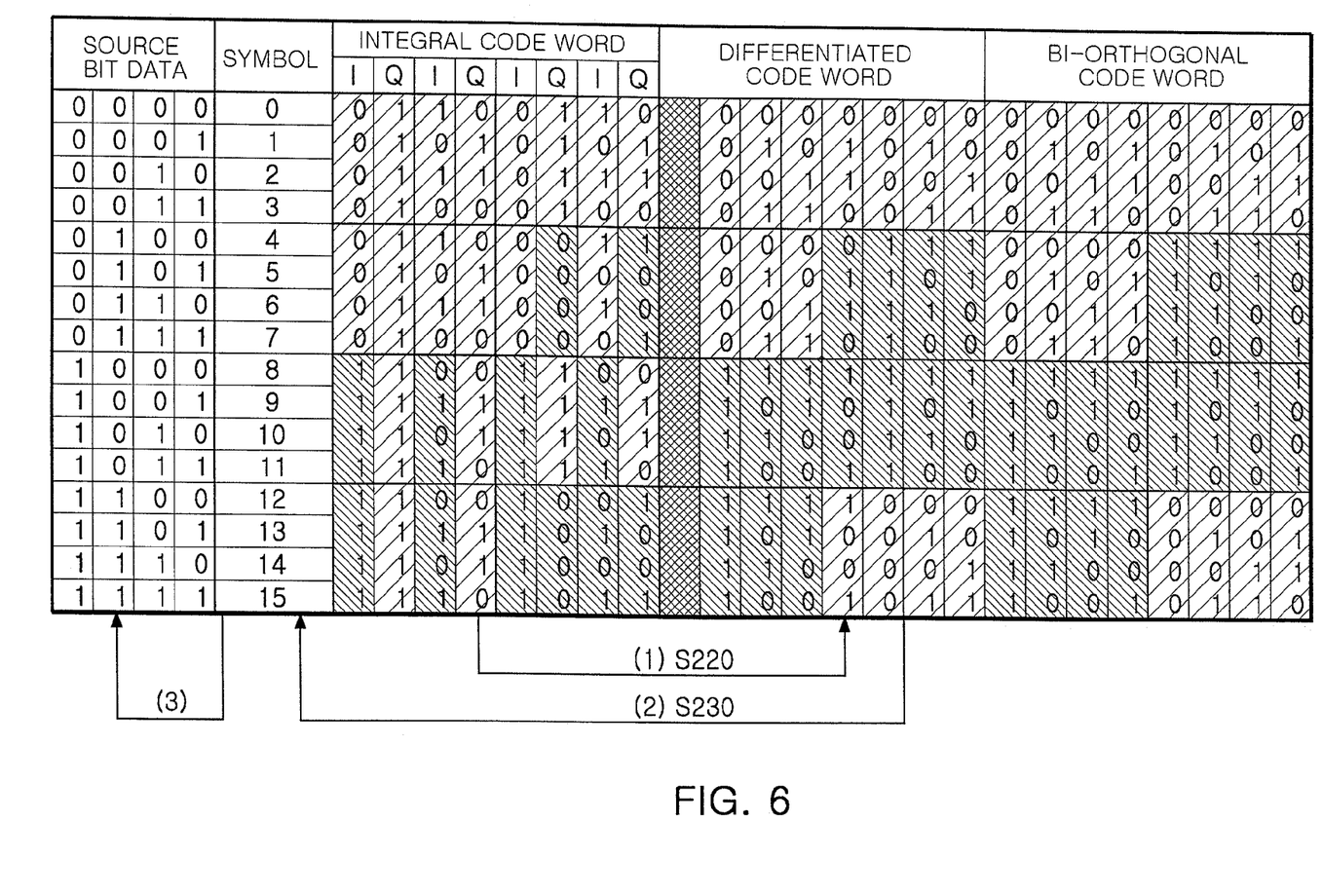
FIG. 6 is a diagram illustrating signal processing in a DSSS receiver according to an exemplary embodiment of the present invention.

FIG. 6 is a diagram illustrating signal processing in the DSSS receiver 200.

Referring to FIG. 6, (1) S220 indicates a signal processing process in the differential circuit unit 220 of the DSSS receiver 200, (2) S230 indicates a signal processing process in the symbol detection unit 230 of the DSSS receiver 200, and (3) indicates a process of detecting source bit data from a symbol from the symbol detection unit 230.

Figure 7:
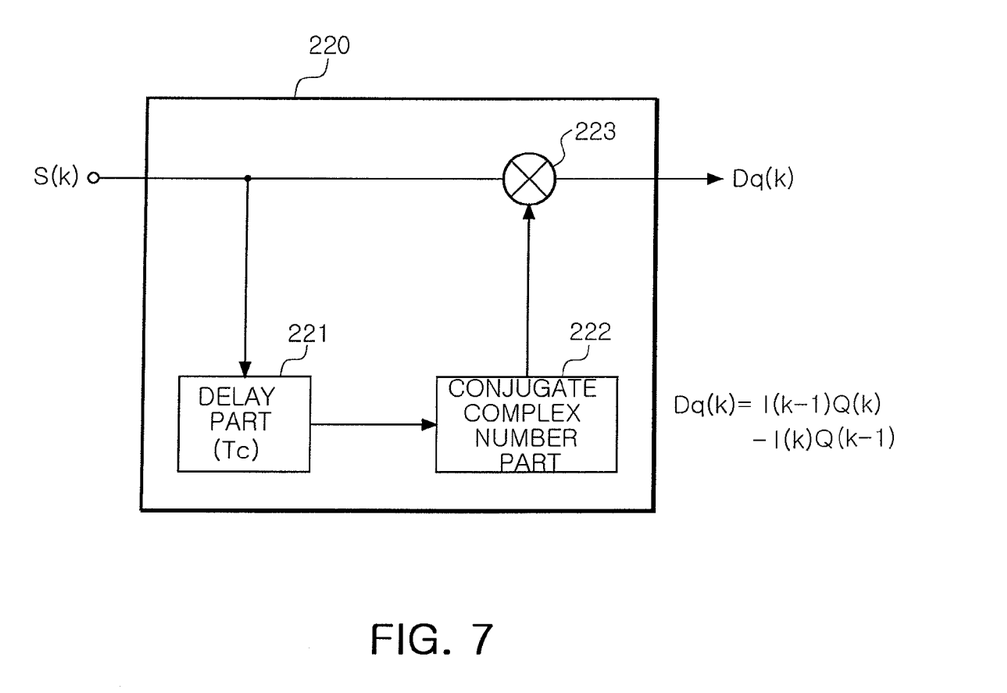
FIG. 7 is a configuration diagram illustrating a differential circuit unit according to an exemplary embodiment of the present invention.

FIG. 7 is a configuration diagram illustrating the differential circuit unit 220.

Referring to FIG. 7, the differential circuit unit 220 includes a delay part 221 delaying a digital signal S(k) from the RF receiving unit 210 by a preset amount of time; a conjugate complex number part 222 deriving a conjugate complex number from a signal from the delay part 221; and a multiplier 223 multiplying the digital signal S(k) from the RF receiving unit 210 by a signal from the conjugate complex number part 222.

In the symbol detection unit 230, each of the plurality of reference code words comprises $2^{(N-1)}$ of codes corresponding to the integral code words obtained by integrating the bi-orthogonal code words.

For example, when the integral code mapping unit 110 maps source bit data in one of $2^4$ (16) of preset symbols 0 and 1 to 15 by 4 bits, the symbol detection unit 230 sets a plurality of reference code words having $2^{(4-1)}-1$ (7) of codes.

Hereinafter, the effects of the present invention will be described with reference to the attached drawings.

Referring to FIGS. 2 to 7, the DSSS transceiver according to an exemplary embodiment of the present invention includes the DSSS transmitter 100 and the DSSS receiver 200.

Referring to FIGS. 2, 3, and 5, the DSSS transmitter 100 will be described.

In FIG. 2, the DSSS transmitter 100 includes the integral code mapping unit 110 and the RF transmitting unit 120.

In this case, the integral code mapping unit 110 maps source bit data in one of $2^N$ of predetermined symbols by N bits and maps the symbol in one of integral code words that are obtained by previously integrating each of $2^N$ of bi-orthogonal code words.

For example, the integral code mapping unit 110 maps the source bit data in one of $2^4$ (16) of preset symbols 0 and 1 to 15 by 4 bits and maps the symbol in one of integral code words in a form obtained by previously integrating each of $2^4$ (16) of bi-orthogonal code words. In this case, each of the integral code words may be formed of $2^{(4-1)}-1$ (7) of codes.

The RF transmitting unit 120 transmits the integral code word mapped by the integral code mapping unit 110 over an RF carrier wave.

Referring to FIG. 3, the RF transmitting unit will be described.

In FIG. 3, the RF transmitting unit 120 includes the serial-to-parallel converter 121, the first pulse shaping filter 122, the second pulse shaping filter 123, the first DAC 124, the second DAC 125, and the transmitting part 126. In this case, the serial-to-parallel converter 121 divides the integral code word into a bit row whose order is an odd number and a bit row whose order is an even number and outputs the bit rows to the first pulse shaping filter 122 and the second pulse shaping filter 123.

The first pulse shaping filter 122 converts an I digital signal including the bit row whose order is an odd number from the serial-to-parallel converter 121 into an analog pulse signal and outputs the analog pulse signal to the first DAC 124. The second pulse shaping filter 123 converts a Q digital signal including the bit row whose order is an even number from the serial-to-parallel converter 121 into an analog pulse signal and outputs the analog pulse signal to the second DAC 125.

The first DAC 124 converts the analog pulse signal from the first pulse shaping filter 122 into an I analog signal. The second DAC 125 converts the analog pulse signal from the second pulse shaping filter 123 into a Q analog signal.

The transmitting part 126 transmits the I analog signal from the first DAC 124 and the Q analog signal from the second DAC 125 over a preset RF carrier wave.

Referring to FIG. 5, for example, when the source bit data is mapped in one of $2^4$ (16) of preset symbols 0 and 1 to 15 by 4 bits, the source bit data is previously divided a group of 4 bits and mapped in each of 16 symbols. The each of the 16 symbols is previously mapped in each of 16 of integral code words.

In this case, in the process S110 of mapping source bit data in an integral code word when the source bit data occurs, the source bit data is divided into a group of 4 bits and mapped in one of 16 of symbols (S111) and the symbol is mapped in one of 16 of integral code words (S112).

Referring to FIG. 5, for example, source bit data 0000 is mapped in a symbol 0 and the symbol 0 is mapped in 0110 0110. Source bit data 0001 is mapped in a symbol 1 and the symbol 1 is mapped in 0101 0101. Source bit data 0010 is mapped in a symbol 2 and the symbol 2 is mapped in 0111 0111. Similarly, source bit data 1111 is mapped in a symbol 15 and the symbol 15 is mapped in 1110 1011.

Hereinafter, the DSSS receiver 200 will be described with reference to FIGS. 2, 4, 6, and 7.

Referring to FIG. 2, the DSSS receiver 200 includes the RF receiving unit 210, the differential circuit unit 220, and the symbol detection unit 230.

In this case, the RF receiving unit 210 removes an RF carrier wave from an RF signal from the RF transmitting unit 120 and converts an analog signal obtained by removing the RF carrier wave from the RF signal, into a digital signal, that is, an integral code word.

The differential circuit unit 220 differentiates and converts the digital signal from the RF receiving unit 210 into a bi-orthogonal code word.

The symbol detection unit 230 detects a symbol corresponding to a maximum value of correlation values between the bi-orthogonal code word from the differential circuit unit 220 between each of a plurality of reference code words.

Referring to FIG. 4, the RF receiving unit 210 includes the receiving part 211 and the A/D converter 212. In this case, the receiving part 211 removes an RF carrier wave from an RF signal from the RF transmitting unit 120 and converts the RF signal into an analog signal. The A/D converter 212 converts the analog signal from the receiving part 211 into a digital signal.

Referring to FIG. 6, for example, when source bit data is mapped in one of $2^4$ (16) of predetermined symbols 0 and 1 to 15 by 4 bits, the differential circuit unit 220 of the DSSS receiver 200 differentiates an inputted integral code word and outputs differentiated code word ((1) S220).

The symbol detection unit 230 of the DSSS receiver 200 converts the differentiated code word from the differential circuit unit 220 into a symbol ((2) S230). Source bit data corresponding to the symbol from the symbol detection unit 230 is detected (3).

Referring to FIG. 7, the differential circuit unit 220 includes the delay part 221, the conjugate complex number part 222, and the multiplier 223. In this case, the delay part 221 delays a digital signal S(k) from the RF receiving unit 210 by a preset amount of time. The conjugate complex number 222 derives a conjugate complex number from a signal from the delay part 221. The multiplier 223 multiplies the digital signal S(k) from the RF receiving unit 210 by the signal from the conjugate complex number 222 and outputs a differentiated code word.

On the other hand, a process of removing a frequency error by the differential circuit unit 220 will be described as follows.

In an operation process of the differential circuit unit 220, an operation is executed by using only an imaginary number part because bi-orthogonal code information is present only in an imaginary number part of a differentiated complex signal.

When a reference signal is S(k)=I+jQ, a differential output of the reference signal is Ds(k), a signal delayed by the delay part 221 of the differential circuit unit 220 is S(k−Tc), and a signal outputted from the conjugate complex number part 222 of the differential circuit unit 220 is (S(k−Tc))*, the differential output Ds(k) of the differential circuit unit 220 is as shown in following Equation 1.

$$Ds(k) = S(k) \times (S(k - TC)^*)e^{j\{\phi(K)-\phi(k-Tc)\}} IDs + jQDs \quad \text{Equation (1)}$$

In Equation 1, QDs including code information is as shown in following Equation 2.

$$QDs(k)=Qs(k)\times(Is(k-Tc))-Is(k)\times(Qs(k-Tc)) \quad \text{Equation (2)}$$

When a received input of the differential circuit unit 220 is r(k), an output thereof is Dr(k), a signal delayed by the delay part 221 of the differential circuit unit 220 is r(k−Tc), and a signal outputted from the conjugate complex number 222 of the differential circuit unit 220 is (r(k−Tc))*, an output Dr(k) of the differential circuit unit 220 is as shown in following Equation 3.

$$Dr(k) = r(k) \times (r(k - Tc)^*)a(k) \quad \text{Equation (3)}$$
$$e^{j\{\theta(k)+\phi(k)+2\pi foTsTck\}}a(k)e^{-j\{\theta(k-Tc)+\phi(k-Tc)+2\pi foTs(k-Tc)k\}}$$

In Equation 3, when $\phi(k)$ is a phase error, $2\pi foTs$ is a frequency error, $\theta(k)$ is an information data phase, $a(k)=1$, and $\phi(k)=\phi(k-Tc)$, Equation 3 may be readjusted as shown in following Equation 4.

$$Dr(k)=e^{j\{\theta(k)-\theta(k-Tc)-2\pi foTsTc\}}=IDr+jQDr \quad \text{Equation (4)}$$

Referring to Equation 4, the frequency error is $2\pi foTsTc$ and becomes a constant. Finally, it may be known that the frequency error is removed.

On the other hand, when the source bit data is mapped in one of $2^4$ (16) of preset symbols 0 and 1 to 15 by 4 bits, each of 16 of reference code words includes $2^{(4-1)}-1$ (7) of codes corresponding to codes of an integral code word obtained by integrating the bi-orthogonal code word.

In this case, as described above, referring to FIG. 6, when a differentiated code word is inputted, the symbol detection unit 230 converts the inputted differentiated code word into a corresponding symbol. The symbol is converted into source bit data (3).

Referring to FIG. 6, for example, an integral code word 0110 0110 is mapped in a differentiated code word 000 0000, and the differentiated code word 000 0000 is mapped in a symbol 0. An integral code word 0101 0101 is mapped in a differentiated code word 010 1010, and the differentiated code word 010 1010 is mapped in a symbol 1. An integral code word 0111 0111 is mapped in a differentiated code word 001 1001, and the differentiated code word 001 1001 is mapped in a symbol 2. As described above, an integral code word 1110 1011 is mapped in a differentiated code word 100 1011, and the differentiated code word 100 1011 is mapped in a symbol 15.

The symbol 0 is mapped in source bit data 0000, the symbol 1 is mapped in source bit data 0001, and the symbol 2 is mapped in source bit data 1101. As described above, the symbol 15 is mapped in source bit data 1111.

Figure 8:
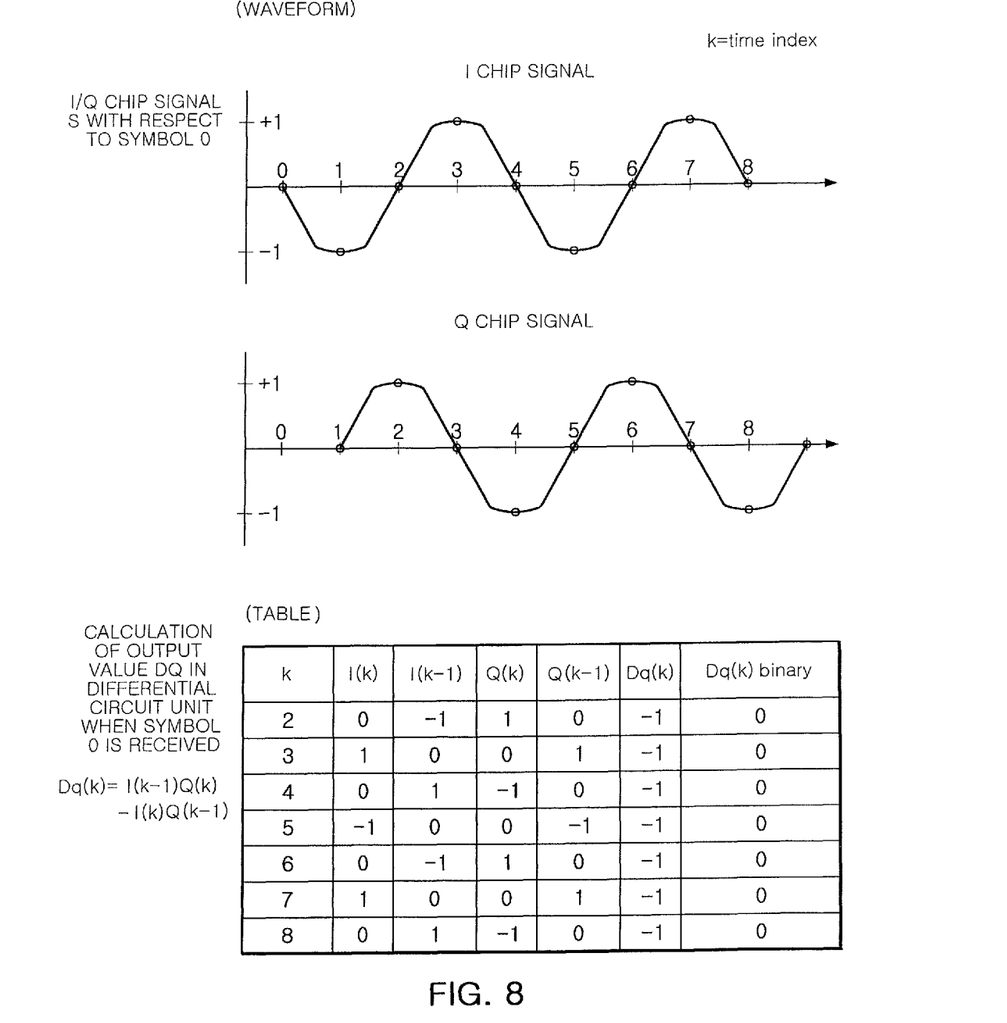
FIG. 8 is a diagram illustrating signal waveforms and a table for describing operations of the differential circuit unit.

Referring to FIG. 8, an output Dq of the differential circuit unit 220 with respect to the symbol 0 may be easily known. That is, when applying I(k) and Q(k) to Equation 5 based on a point of k=2, an output Dq(k) may be obtained as shown in FIG. 8.

$$Dq(k)=I(k-1)Q(k)-I(k)Q(k-1) \quad \text{Equation (5)}$$

As described above, to use a structure of the differential circuit unit 220 excellently removing a frequency error and a phase error in the DSSS receiver 200, a bi-orthogonal code previously integrated in the DSSS transmitter 100 is prepared, source bit data is mapped in the bi-orthogonal code previously integrated, and the DSSS receiver 200 restores an original bi-orthogonal code by differentiating the integrated code, thereby normally detecting a symbol while reducing a frequency error.

While the present invention has been shown and described in connection with the exemplary embodiments, it will be apparent to those skilled in the art that modifications and variations can be made without departing from the spirit and scope of the invention as defined by the appended claims.

What is claimed is:

1. A direct sequence spread spectrum (DSSS) transceiver comprising a DSSS transmitter and a DSSS receiver, wherein the DSSS transmitter comprises:
    an integral code mapping unit mapping source bit data in one of $2^N$ (N is a natural number) of predetermined symbols by N bits and mapping the symbol in one of integral code words that are obtained by previously integrating each of $2^N$ of bi-orthogonal code words; and
    a radio frequency (RF) transmitting unit transmitting the integral code words mapped by the integral code mapping unit over an RF carrier wave, and
the DSSS receiver comprises:
    an RF receiving unit removing an RF carrier wave from an RF signal from the RF transmitting unit and converting an analog signal obtained by removing the RF carrier wave from the RF signal into a digital signal;
    a differential circuit unit differentiating and converting the digital signal from the RF receiving unit into bi-orthogonal code words; and
    a symbol detection unit detecting a symbol corresponding to a maximum value of correlation values between bi-orthogonal code word from the differential circuit unit and a plurality of predetermined reference code words.

2. The DSSS transceiver of claim 1, wherein, in the integral code mapping unit, each of the integral code words is formed of $2^{(N-1)}-1$ of codes and the symbol is mapped in one of the integral code words.

3. The DSSS transceiver of claim 1, wherein the RF transmitting unit comprises:
    a serial-to-parallel converter dividing the integral code word into a bit row whose order is an odd number and a bit row whose order is an even number;
    a first pulse shaping filter converting an I digital signal including the bit row whose order is an odd number from the serial-to-parallel converter into an analog pulse signal;
    a second pulse shaping filter converting a Q digital signal including the bit row whose order is an even number from the serial-to-parallel converter into an analog pulse signal;
    a first digital-to-analog converter (DAC) converting the analog pulse signal from the first pulse shaping filter into an I analog signal;
    a second DAC converting the analog pulse signal from the second pulse shaping filter into a Q analog signal; and
    a transmitting unit transmitting the I analog signal from the first DAC and the Q analog signal from the second DAC over a predetermined RF carrier wave.

4. The DSSS transceiver of claim 1, wherein the RF receiving unit comprises:
    a receiving unit converting an RF signal from the RF transmitting unit into an analog signal by removing an RF carrier wave from the RF signal; and
    an analog-to-digital converter converting the analog signal from the receiving unit into a digital signal.

5. The DSSS transceiver of claim 1, wherein the differential circuit unit comprises:
    a delay part delaying a digital signal from the RF receiving unit by a preset amount of time;
    a conjugate complex number part deriving a conjugate complex number from a signal from the delay part; and
    a multiplier multiplying the digital signal from the RF receiving unit by a signal from the conjugate complex number part.

6. The DSSS transceiver of claim 1, wherein, in the symbol detection unit, each of the plurality of reference code words comprises $2^{(N-1)}$ of codes corresponding to the integral code words obtained by integrating the bi-orthogonal code words.

* * * * *